(12) United States Patent
Oouchi et al.

(10) Patent No.: US 10,763,754 B2
(45) Date of Patent: Sep. 1, 2020

(54) POWER SUPPLY DEVICE

(71) Applicant: Hitachi Automotive Systems, Ltd., Hitachinaka-shi, Ibaraki (JP)

(72) Inventors: Takayuki Oouchi, Tokyo (JP); Takae Shimada, Tokyo (JP); Fumihiro Sato, Tokyo (JP); Shintaro Tanaka, Tokyo (JP); Kenji Kubo, Hitachinaka (JP); Eigo Kishimoto, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 558 days.

(21) Appl. No.: 15/538,858

(22) PCT Filed: Nov. 18, 2015

(86) PCT No.: PCT/JP2015/082331
§ 371 (c)(1),
(2) Date: Jun. 22, 2017

(87) PCT Pub. No.: WO2016/103990
PCT Pub. Date: Jun. 30, 2016

(65) Prior Publication Data
US 2017/0358987 A1    Dec. 14, 2017

(30) Foreign Application Priority Data
Dec. 26, 2014   (JP) .................................. 2014-263811

(51) Int. Cl.
*H02M 3/335* (2006.01)
*H02J 7/00* (2006.01)
(Continued)

(52) U.S. Cl.
CPC ........... *H02M 3/3353* (2013.01); *B60L 53/14* (2019.02); *B60L 53/18* (2019.02); *B60L 53/22* (2019.02);
(Continued)

(58) Field of Classification Search
CPC ...... H02M 3/3353; B60L 53/22; B60L 58/20; B60L 53/18; B60L 53/14; B60L 2210/30;
(Continued)

(56) References Cited

U.S. PATENT DOCUMENTS 4,563,732 A * 1/1986 Ljungqvist .......... H02M 7/7575
363/35
4,694,194 A * 9/1987 Hansel .............. H02M 7/53803
307/66
(Continued)

FOREIGN PATENT DOCUMENTS

DE          19713814 A1   10/1998
JP         2006-081263 A   3/2006
(Continued)

OTHER PUBLICATIONS

Office Action issued in corresponding German Application No. 112015005394.8 dated Apr. 23, 2019.
(Continued)

Primary Examiner — M Baye Diao
(74) Attorney, Agent, or Firm — Foley & Lardner LLP

(57) ABSTRACT

An object of the present invention is to provide a highly efficient power supply device.
A power supply device 1 according to the present invention includes a bidirectional DC-DC converter 3 and an insulated DC-DC converter 4. The bidirectional DC-DC converter 3 receives a main battery 5 and outputs a direct-current link voltage Vlink. The insulated DC-DC converter 4 receives the link voltage Vlink and supplies power to a load 7. The link voltage Vlink, which is an output of the bidirectional DC-DC converter 3, changes according to the output voltage of the insulated DC-DC converter 4.

5 Claims, 4 Drawing Sheets

(51) Int. Cl.
    *H02J 7/02*     (2016.01)
    *B60L 53/14*     (2019.01)
    *B60L 53/18*     (2019.01)
    *B60L 58/20*     (2019.01)
    *B60L 53/22*     (2019.01)
    *H02J 7/34*     (2006.01)

(52) U.S. Cl.
CPC ............... B60L 58/20 (2019.02); H02J 7/00 (2013.01); H02J 7/0013 (2013.01); H02J 7/02 (2013.01); H02J 7/342 (2020.01); *B60L 2210/10* (2013.01); *B60L 2210/30* (2013.01); *Y02T 10/7005* (2013.01); *Y02T 10/7055* (2013.01); *Y02T 10/7066* (2013.01); *Y02T 10/7088* (2013.01); *Y02T 10/7216* (2013.01); *Y02T 10/92* (2013.01); *Y02T 90/121* (2013.01); *Y02T 90/127* (2013.01); *Y02T 90/14* (2013.01)

(58) Field of Classification Search
CPC . B60L 2210/10; H02J 7/02; H02J 7/00; H02J 7/0013; Y02T 10/92; Y02T 10/7055; Y02T 10/7066; Y02T 10/7088; Y02T 10/7216; Y02T 90/14; Y02T 90/121; Y02T 90/127; Y02T 10/7005
USPC ......................................................... 320/140
See application file for complete search history.

(56) References Cited

U.S. PATENT DOCUMENTS

| | | | | |
|---|---|---|---|---|
| 4,884,185 A * | 11/1989 | Hubert | ................... | H02P 27/08 363/56.02 |
| 5,572,112 A * | 11/1996 | Saeki | ....................... | G05F 1/56 323/222 |
| 5,724,477 A * | 3/1998 | Webster | ................. | H02P 29/026 388/815 |
| 5,932,994 A * | 8/1999 | Jo | ............................ | G05F 1/67 323/222 |
| 6,166,513 A * | 12/2000 | Hammond | .............. | H02M 7/49 318/762 |
| 7,568,537 B2 * | 8/2009 | King | ........................ | B60K 6/28 180/65.1 |
| 2003/0137193 A1 * | 7/2003 | Belschner | ........... | H01M 16/006 307/9.1 |
| 2006/0103359 A1 * | 5/2006 | Watanabe | ........... | H02M 3/1588 323/225 |
| 2007/0164693 A1 * | 7/2007 | King | ........................ | B60L 50/40 318/109 |
| 2007/0216452 A1 * | 9/2007 | Matsumoto | .............. | B60K 6/28 327/116 |
| 2008/0253236 A1 * | 10/2008 | Nakamiya | .............. | G04C 10/00 368/204 |
| 2012/0068663 A1 | 3/2012 | Tanikawa et al. | | |
| 2013/0106342 A1 | 5/2013 | Iwata et al. | | |
| 2014/0362605 A1 | 12/2014 | Jang et al. | | |
| 2015/0314694 A1 * | 11/2015 | Alakula | ................... | B60L 50/51 320/109 |
| 2015/0314702 A1 * | 11/2015 | Yang | ........................ | H02J 7/34 701/22 |
| 2015/0352961 A1 * | 12/2015 | Kim | ........................ | B60L 3/00 318/139 |

FOREIGN PATENT DOCUMENTS

| | | |
|---|---|---|
| JP | 2006-149127 A | 6/2006 |
| JP | 2007-068290 A | 3/2007 |
| JP | 2009-042157 A | 2/2009 |
| JP | 2012-070518 A | 4/2012 |
| JP | 2013-099069 A | 5/2013 |

OTHER PUBLICATIONS

International Search Report dated Mar. 8, 2016 as issued in corresponding International Application No. PCT/JP2015/082331.

* cited by examiner

POWER SUPPLY DEVICE

TECHNICAL FIELD

The present invention relates to a power supply device. Particularly, the present invention relates to a power supply device that converts and supplies power from a high voltage battery to a low voltage battery and a load.

BACKGROUND ART

In recent years, with the growing awareness of global environmental conservation, the expansion of electric vehicles and plug-in hybrid vehicles is in demand. These cars include a main battery that supplies power to a motor during traveling. When charging this main battery from a commercial alternating-current power supply, there is a need for a power supply device that has a function for insulating between the commercial power supply and the main battery to charge with less power and in a safe manner. This power supply device needs to have high conversion efficiency.

An electric vehicle includes an insulated direct current to direct current (DC-DC) converter mounted therein that supplies power from a high-voltage main battery to a load of an auxiliary equipment system of an electrical component during traveling. Since the range that the voltage of the main battery fluctuates is large between in the fully charged state where the voltage is maximum and in the fully discharged state where the voltage is minimum, the insulated DC-DC converter is required to operate with high efficiency over a wide operating voltage range. However, when the range of the input voltage to the insulated DC-DC converter is wide, the control duty of a switching power supply needs to be narrowed depending on conditions, and this may reduce the conversion efficiency.

For the purpose of converting power with high efficiency, PTL 1 discloses a configuration in which a DC-DC converter and an insulated DC-DC converter are connected in series, and a conversion ratio of the insulated DC-DC converter is set to fixed magnification and the first (non-insulated) DC-DC converter to variable magnification, with the aim of improving conversion efficiency of overall converters.

CITATION LIST

Patent Literature

PTL 1: JP 2013-099069 A

SUMMARY OF INVENTION

Technical Problem

Generally, the efficiency of an insulated DC-DC converter tends to decrease as the input voltage range is widened. Inevitably, however, the voltage of the main battery fluctuates largely due to charging and discharging, and thus increasing the efficiency of the insulated DC-DC converter is difficult. In order to improve the efficiency of the overall converters, the configuration using two DC-DC converters, as disclosed in PTL 1, fixes the conversion magnification of the insulated converter in which the turns ratio of a transformer affects the input/output voltage ratio. As conceivable control, it is assumed that the fluctuation range of a large input voltage range is converted to a constant intermediate output voltage by the non-insulated DC-DC converter having non-fixed magnification, and a final output is obtained from the insulated converter having fixed magnification.

However, since a low voltage battery is also connected to a load of an auxiliary equipment system, the voltage on the output side also fluctuates in practice. Normally, the value of the voltage fluctuation range is, for example, about 10.5 to 15.5 V with respect to the output of 12 V, which is smaller than the fluctuation range of the main battery that becomes even 100 V or more. However, the fluctuation range is large when seen as a relative voltage fluctuation ratio. The details of the control that copes with such voltage fluctuation are not disclosed in PTL 1. Furthermore, in cases where conversion is performed at fixed magnification in accordance with the output, the intermediate output voltage output by the non-insulated DC-DC converter fluctuates largely. This makes it difficult to attain the initial goal of coping with a wide input voltage range and achieving a highly efficient converter.

An object of the present invention is to provide a method for controlling a highly efficient power supply device that converts and supplies power from a high-voltage main battery to a load to which a low voltage battery of an auxiliary equipment system is connected.

Solution to Problem

To achieve the object described above, a power supply device according to the present invention includes a direct current to direct current (DC-DC) converter configured to supply power to a low voltage line and a chopper configured to receive a voltage of a high voltage battery and output a link voltage to be input to the DC-DC converter, wherein the link voltage is changed according to a voltage of the low voltage line.

Advantageous Effects of Invention

According to the present invention, it is possible to provide a highly efficient power supply device that receives the voltage of a main battery and supplies power to a sub-battery and a load.

DESCRIPTION OF EMBODIMENTS

Hereinafter, embodiments of the present invention will be described in detail with reference to the drawings.

First Embodiment

Figure 1:
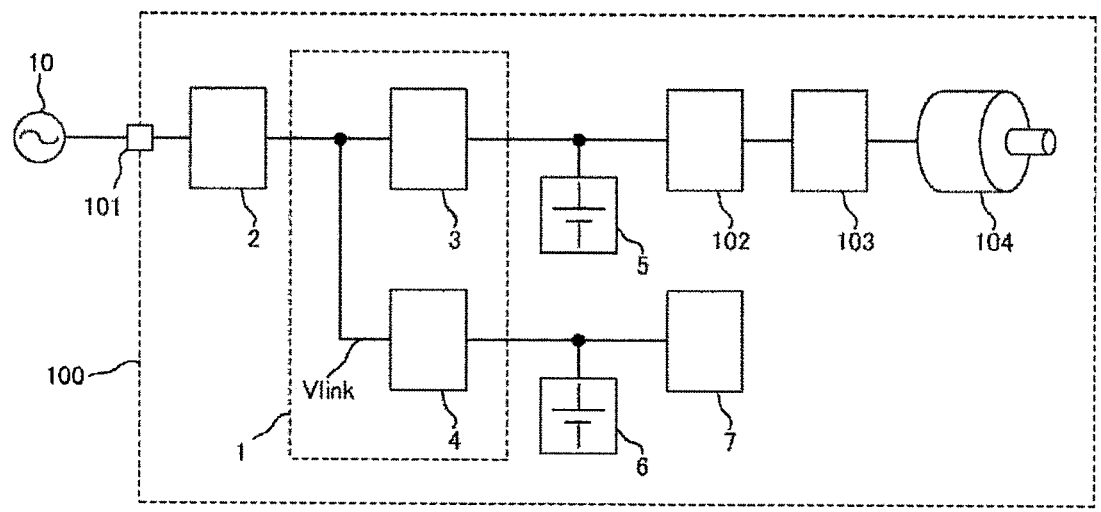
FIG. 1 is a schematic configuration diagram of a power supply device 1 and a power supply system of an electric vehicle 100 adopting the same according to a first embodiment.

FIG. 1 is a schematic configuration diagram of a power supply device 1 and a power supply system of an electric vehicle 100 adopting the same according to the present embodiment. The power supply device 1 includes a bidirectional DC-DC converter 3 and an insulated DC-DC converter 4. The bidirectional DC-DC converter 3 receives a voltage of a main battery 5 and outputs a direct-current link voltage Vlink. The insulated DC-DC converter 4 receives the link voltage Vlink and supplies power to a load.

An insulated alternating current to direct current (AC-DC) converter 2 is connected to a wiring to which the link voltage Vlink is applied. The insulated AC-DC converter 2 outputs a direct-current voltage insulated from an alternating-current power supply 10. In addition, as described above, the main battery 5 is connected to an output terminal of the bidirectional DC-DC converter 3. Furthermore, the output side of the insulated DC-DC converter 4 is connected to the load 7 to which a low voltage battery 6 of an auxiliary equipment system is connected. A charging connector 101 connects the alternating-current power supply 10 and the electric vehicle 100.

Figure 2:
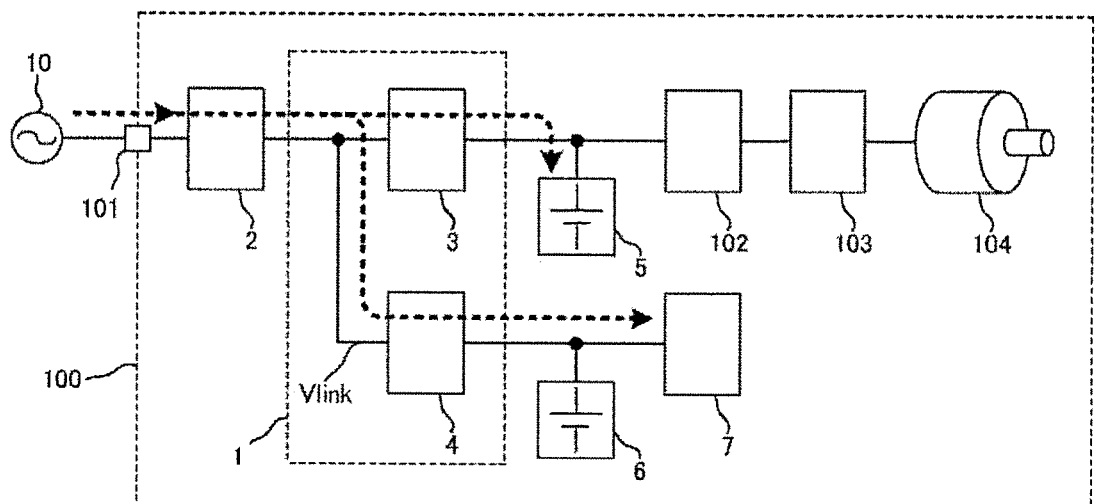
FIG. 2 is a diagram illustrating a power flow of the power supply device 1 and the electric vehicle 100 during charging according to the first embodiment.

With reference to FIG. 2, a description will be given of a power flow of the power supply device 1 and the electric vehicle 100 during charging. During charging, the insulated AC-DC converter 2 receives power of the alternating-current power supply 10 and outputs a link voltage Vlink. The bidirectional DC-DC converter 3 receives the link voltage Vlink and charges the main battery 5. Furthermore, when the load 7 consumes power, the insulated DC-DC converter 4 is operated to supply power from the link voltage Vlink to the load 7. In this way, power of the alternating-current power supply 10 is used during charging to charge the main battery 5 and supply the power to the load 7.

Figure 3:
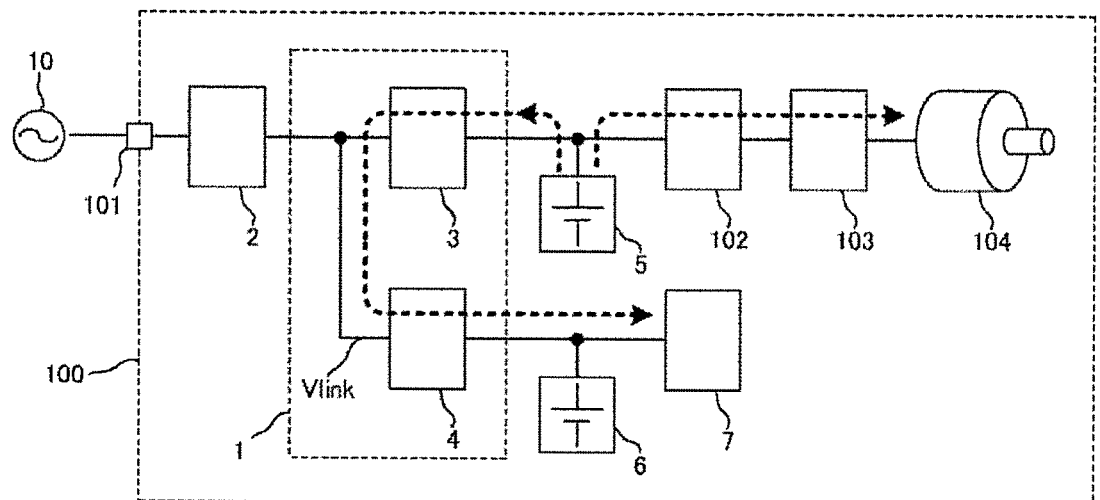
FIG. 3 is a diagram illustrating a power flow of the power supply device 1 and the electric vehicle 100 during traveling according to the first embodiment.

With reference to FIG. 3, a description will be given of a power flow of the power supply device 1 and the electric vehicle 100 during traveling. During traveling, power is supplied from the main battery 5 to a power motor 104 via a converter 102 and an inverter 103. The bidirectional DC-DC converter 3 receives a voltage of the main battery 5 and outputs a link voltage Vlink, causing the insulated DC-DC converter 4 to operate and supply power from the link voltage Vlink to the load 7. In this way, power of the main battery 5 is used during traveling to supply the power to the load 7.

Figure 4:
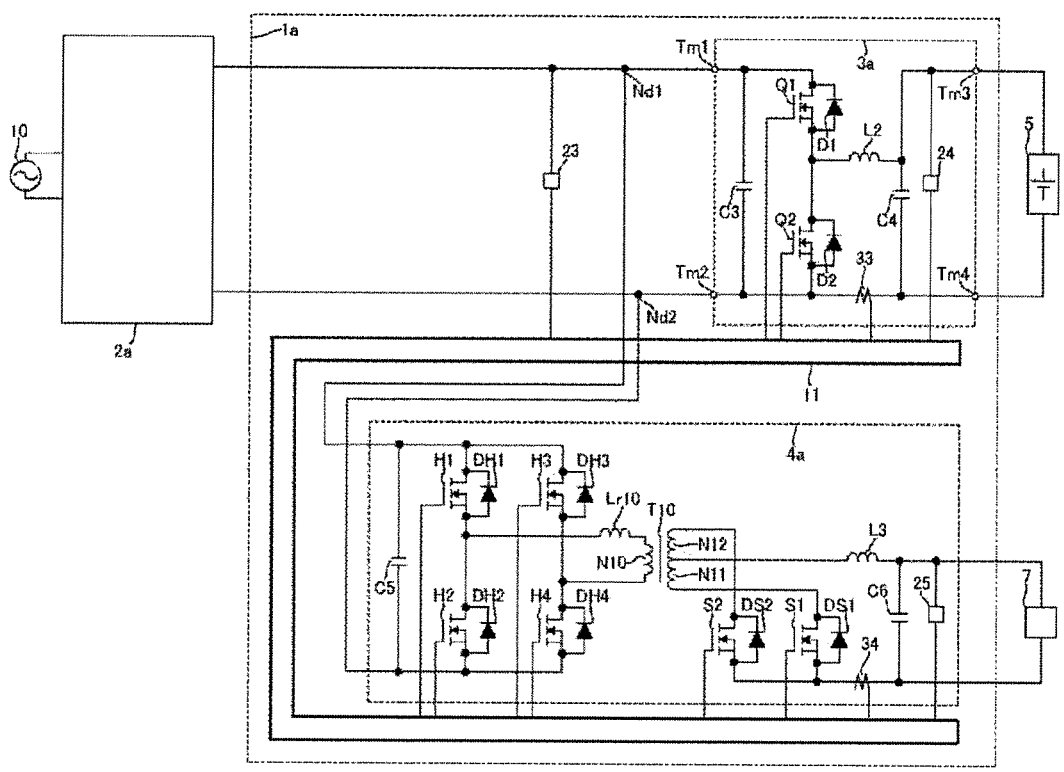
FIG. 4 is a circuit configuration diagram of a power supply device 1*a* according to the first embodiment.

FIG. 4 is a circuit configuration diagram of a power supply device 1a according to the present embodiment. An insulated AC-DC converter 2a receives power of the alternating-current power supply 10 and outputs a link voltage Vlink insulated from the alternating-current power supply 10 to between a node Nd1 and a node Nd2. The power supply device 1a is connected to the insulated AC-DC converter 2a.

During charging, a bidirectional DC-DC converter 3a receives the link voltage Vlink in between the node Nd1 and the node Nd2 and charges the main battery 5. During traveling, the bidirectional DC-DC converter 3a outputs the link voltage Vlink from the main battery 5. An insulated DC-DC converter 4a receives the link voltage Vlink and supplies power to the load 7. A control means 11 controls the bidirectional DC-DC converter 3a and the insulated DC-DC converter 4a. The bidirectional DC-DC converter 3a functions as a chopper that receives the voltage of the high voltage main battery 5 and outputs the link voltage Vlink.

The bidirectional DC-DC converter 3a includes a smoothing capacitor C3, a switching element Q1, a switching element Q2, a smoothing inductor L2, and a smoothing capacitor C4. The smoothing capacitor C3 is connected between a terminal Tm1 and a terminal Tm2. The switching element Q1 and the switching element Q2 are connected in series between the terminal Tm1 and the terminal Tm2. The smoothing inductor L2 and the smoothing capacitor C4 are connected in series between both ends of the switching element Q2. The smoothing capacitor C4 is connected between a terminal Tm3 and a terminal Tm4.

The link voltage Vlink is connected between the terminal Tm1 and the terminal Tm2, and the main battery 5 is connected between the terminal Tm3 and the terminal Tm4. Diodes D1 and D2 are connected to the switching elements Q1 and Q2, respectively.

The insulated DC-DC converter 4a receives the link voltage Vlink in between both ends of a smoothing capacitor C5 connected between the node Nd1 and the node Nd2, and supplies the power to the load 7 connected between both ends of a smoothing capacitor C6.

Furthermore, the insulated DC-DC converter 4a includes a resonant inductor Lr10, a winding N10, and a transformer T10. The winding N10 is connected in series with the resonant inductor Lr10. The transformer T10 magnetically couples a winding N11 and a winding N12. Here, the resonant inductor Lr10 may be omitted depending on a leakage inductance and a wiring inductance of the transformer T10.

Switching elements H1 to H4 connected in a full bridge arrangement apply voltage to the winding N10 using the voltage of the smoothing capacitor C5. The voltage generated in the winding N11 and the winding N12 via the winding N10 and the transformer T10 is applied to a smoothing inductor L3 via a diode DS1 and a diode DS2. Current flows through the smoothing inductor L3 by the voltage applied to the smoothing inductor L3, and the voltage is smoothed by the smoothing capacitor C6. This voltage is output to the load 7. It is to be noted that diodes DH1 to DH4 are connected in parallel to the switching elements H1 to H4, respectively.

In cases where metal-oxide-semiconductor field-effect transistors (MOSFETs) are used as a switching element S1 and a switching element S2 that are connected in anti-parallel to the diode DS1 and the diode DS2, respectively, synchronous rectification can be performed to reduce losses by turning on the switching element S1 and the switching element S2 while there is continuity between the diode DS1 and the diode DS2, and then splitting the current of the diode DS1 and the diode DS2 into the switching element S1 and the switching element S2.

The diodes D1 to D2, the diodes DH1 to DH4, the diode DS1, and the diode DS2 are connected in anti-parallel to the switching elements Q1 to Q2, the switching elements H1 to H4, the switching element S1, and the switching element S2, respectively. Here, in cases where MOSFETs are used as the switching elements Q1 to Q2, the switching elements H1 to H4, the switching element S1, and the switching element S2, parasitic diodes of the MOSFETs can be used as the diodes D1 to D2, the diodes DH1 to DH4, the diode DS1, and the diode DS2. In addition, two out of a smoothing capacitor C2, the smoothing capacitor C3, and the smoothing capacitor C5 connected in parallel may be omitted in some cases.

The switching elements Q1 to Q2, the switching elements H1 to H4, the switching element S1, and the switching element S2 are controlled by the control means 11. A voltage sensor 23, a voltage sensor 24, a voltage sensor 25, a current sensor 33, and a current sensor 34 are connected to the control means 11. The voltage sensor 23 detects the link voltage Vlink. The voltage sensor 24 detects the voltage of the smoothing capacitor C4, that is, the voltage of the main battery 5. The voltage sensor 25 detects the output voltage of the insulated DC-DC converter 4a. The current sensor 33 detects the current of the smoothing inductor L2, that is, the current of the main battery 5. The current sensor 34 detects the output current of the insulated DC-DC converter 4a.

In addition, the insulated DC-DC converter 4a controls the output by changing the time ratio (hereinafter, referred to as duty) of the period during which both the switching element H1 (H2) and the switching element H4 (H3) are on and adjusting the time ratio of applying the voltage to the winding N10. As the duty increases, the output power increases. When the switching element H1 (H2) and the switching element H4 (H3) are simultaneously turned on and off, the duty becomes maximum.

When the input voltage of the insulated DC-DC converter 4a decreases, the decrease in the output power can be suppressed by increasing the duty. However, when the input voltage of the insulated DC-DC converter 4a further decreases, it is not possible to obtain desired output power even if the duty is maximized. In order to obtain the desired output power even under the condition where the input voltage of the insulated DC-DC converter 4a is low, the turns ratio of the transformer T10 (the number of turns of the winding N11/the number of turns of the winding N10, the number of turns of the winding N12/the number of turns of the winding N10) just needs to be increased. By increasing the turns ratio of the transformer T10, even when the input voltage of the insulated DC-DC converter 4a is low, a high voltage can be generated in the winding N11 and the winding N12, and thus a large output power can be obtained easily.

However, increasing the turns ratio of the transformer T10 in this way results in generation of even higher voltage in the winding N11 and the winding N12 when the input voltage of the insulated DC-DC converter 4a becomes high. For example, when the input voltage of the insulated DC-DC converter 4a is 450 V with the number of turns of the winding N10:the number of turns of the winding N11:the number of turns of the winding N12=22:1:1 (hereinafter, referred to as case A), the voltage applied to the secondary side is about 41 V.

By contrast, in order to obtain approximately the same applied voltage when the insulated DC-DC converter 4a has an input voltage range of 170 V to 450 V and receives a minimum of 170 V, increasing the turns ratio to the number of turns of the winding N10:the number of turns of the winding N11:the number of turns of the winding N12 to 9:1:1 (hereinafter, referred to as case B) allows the secondary side of the transformer T10 to obtain the applied voltage of 37.8 V with respect to the voltage of 170 V of the primary side of the transformer T10. With this turns ratio, however, the voltage of the secondary side of the transformer T10 significantly increases to 100 V with respect to the voltage of 450 V of the primary side of the transformer T10. Accordingly, the voltage applied to the switching element S1, the switching element S2, the diode DS1, and the diode DS2 also increases, and as a result, elements having high withstand voltage become necessary as the switching element S1, the switching element S2, the diode DS1, and the diode DS2. In general, as the withstand voltage increases, the loss of the switching elements and the diodes increases. Therefore, as the input voltage range of the insulated DC-DC converter 4a is widened, the loss tends to increase, reducing the efficiency.

Furthermore, for case A, the duty of the switching elements connected to the primary side of the transformer T10 at the time of maximum load is about 70 to 85% and thus a high numeric value can be used. However, for case B, although a high duty can be used with respect to the input voltage of 170 V, a relatively high voltage is applied to the secondary side when 450 V is input, and thus the operation can only be performed with a low duty of about 30 to 40%. This poses a problem that the peak current and effective current value increase, and the efficiency at the time of switching decreases.

Here, the power supply device 1a according to the present embodiment includes the bidirectional DC-DC converter 3a, and thus the voltage range of the link voltage Vlink can be made narrower than the voltage range of the main battery 5.

When charging the main battery 5 from the alternating-current power supply 10, the bidirectional DC-DC converter 3a causes the switching element Q1 to perform a switching operation and outputs the power which has been input from between the terminal Tm1 and the terminal Tm2 to between the terminal Tm3 and the terminal Tm4. In addition, when supplying the power from the main battery 5 to the load 7, the bidirectional DC-DC converter 3a causes the switching element Q2 to perform a switching operation and outputs the power which has been input from between the terminal Tm3 and the terminal Tm4 to between the terminal Tm1 and the terminal Tm2. At this time, by controlling the on-time ratio of the switching element Q1 and the switching element Q2, it is possible to maintain the link voltage Vlink at any voltage value, for example, at a substantially constant voltage, in a range from a voltage of the main battery 5 or higher.

Furthermore, fixing the switching element Q1 to the ON state and the switching element Q2 to the OFF state allows a through operation, and thus it is possible to substantially short circuit between the terminal Tm1 and the terminal Tm2 and between the terminal Tm3 and the terminal Tm4 via the smoothing inductor L2. When this through operation is performed, the switching element Q1 and the switching element Q2 do not perform switching operations. Therefore, it is possible to suppress the switching loss and core loss of the smoothing inductor L2 while maintaining the link voltage Vlink at a voltage value approximately equal to the voltage of the main battery 5.

With this bidirectional DC-DC converter 3a, the voltage range of the link voltage Vlink can be made narrower than the voltage range of the main battery 5. Therefore, the output voltage range of the insulated AC-DC converter 2a when charging the main battery 5 from the alternating-current power supply 10 can be relatively made narrower, and thus the reduction in efficiency can be suppressed. Furthermore, the input voltage range of the insulated DC-DC converter 4a when supplying power from the main battery 5 to the load 7 can be made relatively narrower, and thus the reduction in efficiency can be suppressed. Therefore, the power supply device 1a according to the present embodiment can charge the main battery 5 from the alternating-current power supply 10 with high efficiency, and can also supply power from the main battery 5 to the load 7 with high efficiency.

Figure 5:
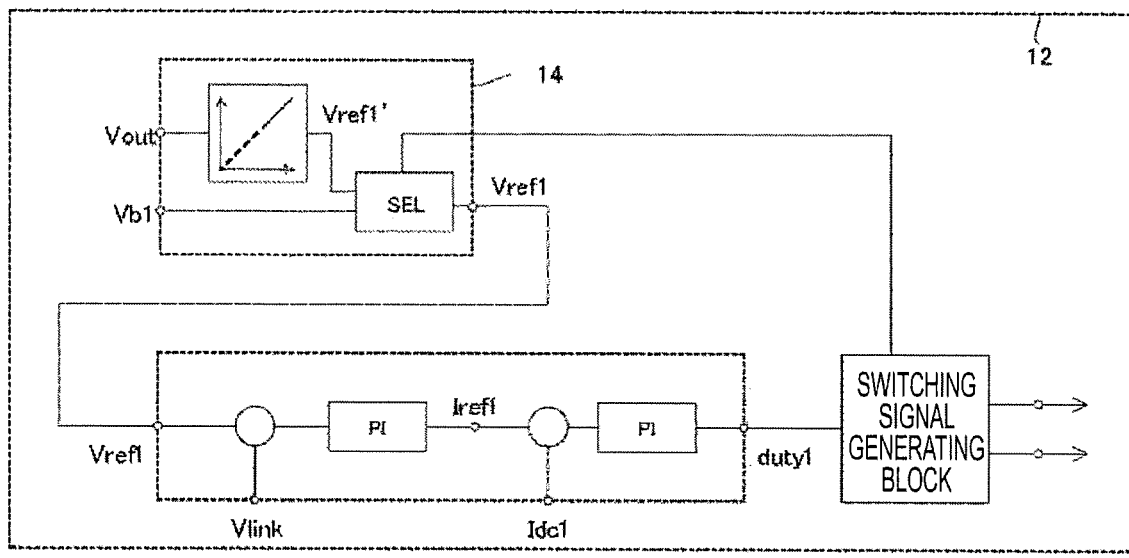
FIG. 5 is a control block diagram of a bidirectional DC-DC converter and a control block diagram of an insulated DC-DC converter according to the first embodiment.
Figure 5:
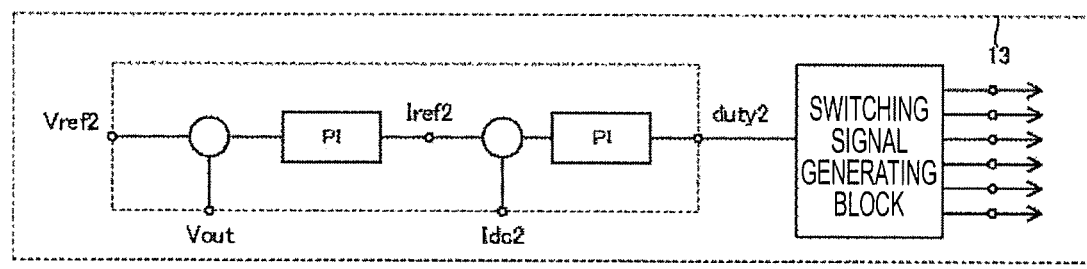

With reference to FIG. 5, a description will be given of the functions of the basic control blocks through which each of the bidirectional DC-DC converter 3a and the insulated DC-DC converter 4a controls the current, the voltage, and the power.

A control block 13 of the insulated DC-DC converter 4a performs PI feedback control based on a voltage Vout, which is the low voltage line, detected by the voltage sensor 25 with respect to a target output voltage Vref2. Furthermore, the control block 13 further performs PI feedback control based on a current Idc2 detected by the current sensor 34, with respect to a control current Iref2 obtained by the PI feedback control. Furthermore, the control block 13 outputs a control pulse of each switching element in a switching signal generating block by using a control value duty2 obtained by the PI feedback control.

Similarly, a control block 12 of the bidirectional DC-DC converter 3a performs general PI feedback control based on a voltage Vlink detected by the voltage sensor 23, with respect to a target output voltage Vref1. Furthermore, the control block 12 further performs PI feedback control based on a current Idc1 detected by the current sensor 33, with respect to the control current Iref1 obtained by the PI feedback control. Furthermore, the control block 12 outputs a control pulse of each switching element in a switching signal generating block by using a control value duty1 obtained by the PI feedback control.

The control block 12 further includes a target voltage setting block 14. With respect to a target output voltage Vref1 serving as a target, the target voltage setting block 14 calculates an input voltage Vref1' assumed from the turns ratio of the transformer T10 with respect to the output voltage Vout of the insulated DC-DC converter 4a. In case of Vref1'>Vb1 in comparison with the battery voltage Vb1 of the main battery 5 detected by the voltage sensor 24, the target voltage setting block 14 sets the target voltage Vref1' to a voltage value of the input voltage Vref. In this way, when the bidirectional converter 3a performs a step-up operation, it is possible to suppress the step-up ratio and achieve high efficiency by calculating and setting a link voltage Vlink optimal for the input of the insulated DC-DC converter 4a in the subsequent stage.

On the other hand, in case of Vref1'<Vb1, since the operation in the step-down is not possible in the bidirectional DC-DC converter 3a, the bidirectional DC-DC converter 3a performs a through operation where the switching element Q1 is set to the ON state and the switching element Q2 to the OFF state on the basis of the result of a selector in the target voltage setting block 14. As described above, the switching element Q1 and the switching element Q2 do not perform switching operations when this through operation is performed. Therefore, it is possible to suppress the switching loss and core loss of the smoothing inductor L2 while maintaining the link voltage Vlink at a voltage value approximately equal to the voltage of the main battery 5.

Here, the output voltage Vout of the insulated DC-DC converter 4a is input to each of the control block 12 and the control block 13 as a control variable. The insulated DC-DC converter 4a performs feedback control such that the output voltage Vout becomes constant with respect to the link voltage Vlink which serves as an input voltage. The bidirectional DC-DC converter 3a performs feedback control over the link voltage Vlink such that the link voltage Vlink matches the input voltage Vref1' which has been set in accordance with the output voltage Vout.

In cases where the control response speeds of the bidirectional DC-DC converter 3a and the bidirectional DC-DC converter 4a are close to each other, there is a possibility that the responses of the bidirectional DC-DC converter 3a and the insulated DC-DC converter 4a against the fluctuation of the output voltage Vout destabilize the output, and depending on the conditions, the outputs of the bidirectional DC-DC converter 3a and the insulated DC-DC converter 4a oscillate. Therefore, by delaying the response speed for determining the target output voltage Vref1' from the output voltage Vout, the control can be stabilized more.

As a specific example, by calculating the average of the output voltage Vout for a certain period of time and inputting the average of the output voltage Vout to the control block 14, an optimum link voltage Vlink can be set while the fluctuation of the output voltage Vout due to a sudden change in the load or the like can be suppressed.

As described above, by introducing the high-voltage link voltage Vlink and then causing the link voltage Vlink to fluctuate in accordance with the output of the insulated DC-DC converter 4a in the subsequent stage as in the power supply device 1a according to the present embodiment, the efficiency of the overall converters can be improved over a wide input voltage range. Particularly, in a situation where the converter in the preceding stage outputs the link voltage in the step-up mode, it is possible to obtain the effect of reduction in the loss of the step-up converter.

Second Embodiment

Figure 6:
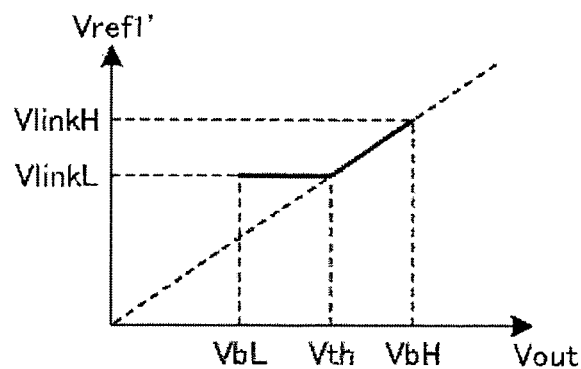
FIG. 6 is a diagram illustrating a relationship between a target value of a link voltage and an output voltage according to a second embodiment.

The basic configuration of the power supply device according to the second embodiment is the same as that of the first embodiment described in FIGS. 1 to 5. However, as illustrated in FIG. 6, a lower limit value is set for a value of the input voltage Vref1' which derives a link voltage Vlink from an output voltage Vout in the control block 14 section, reflecting the value of the output voltage Vout in FIG. 5. That is, in cases where the output voltage Vout is equal to or less than a threshold value Vth, control is performed by fixing the value of the input voltage Vref1' of the link voltage Vlink to a lower limit link voltage VlinkL so as not to be lower than the lower limit link voltage VlinkL. By setting a high-voltage link voltage Vlink, the effect of improved efficiency can be obtained from the narrowed input voltage range of the insulated DC-DC converter 4a. However, in cases where the correlation between the output voltage Vout and the input voltage Vref1' is a simple proportional relationship, the fluctuation range of the output voltage Vout is large. Therefore, when the voltage decreases, the value of the input voltage Vref1' also decreases.

In cases where the decreased input voltage Vref1' is adopted as a target value of the link voltage Vlink, the voltage applied to the secondary side of the transformer T10 of the insulated DC-DC converter 4a decreases, and the output current becomes relatively large with respect to the required output power. Consequently, there is a possibility that the peak current and the effective current value increase and the efficiency at switching decreases. Therefore, when there is a need for suppressing the current of the insulated DC-DC converter 4a in accordance with the relationship between the requested output power and the current, it is effective to set a lower limit value for the input voltage Vref1' as illustrated in FIG. 6.

It is to be noted that although the relationship between the output voltage Vout and the input voltage Vref1' until reaching the lower limit value has been described as proportional, it is not necessary to be linear. For improvement of the efficiency and stabilization of the operation of the converters, it is also effective to provide hysteresis characteristics, which allows for a range of values for cases where the voltage decreases and increases, on the basis of the response characteristics of the load.

Third Embodiment

Figure 7:
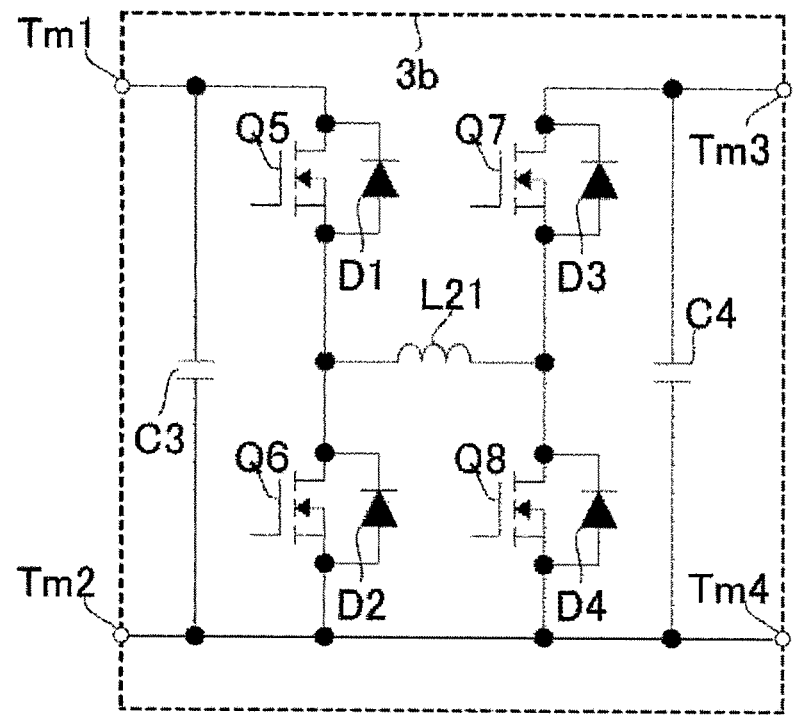
FIG. 7 is a circuit configuration diagram of a bidirectional DC-DC converter 3*b* according to a third embodiment.

FIG. 7 is a circuit diagram of a bidirectional DC-DC converter 3b in which the section corresponding to the bidirectional DC-DC converter 3a in the power supply device 1a according to the present embodiment illustrated in FIG. 4 is replaced with a circuit supporting bidirectional step-up/down.

The bidirectional DC-DC converter 3b includes a smoothing capacitor C3, a switching element Q5, a switching element Q6, a smoothing inductor L21, a switching element Q8, a switching element Q7, and a smoothing capacitor C4. The smoothing capacitor C3 is connected between a terminal Tm1 and a terminal Tm2. The switching element Q5 and the switching element Q6 are connected in series between the terminal Tm1 and the terminal Tm2. The smoothing inductor L21 and the switching element Q8 are connected in series between both ends of the switching element Q6. The switching element Q7 and the smoothing capacitor C4 are connected in series between both ends of the switching element Q8.

A terminal Tm3 and a terminal Tm4 are connected between both ends of the smoothing capacitor C4. The link voltage Vlink is connected between the terminal Tm1 and the terminal Tm2, and the main battery 5 is connected between the terminal Tm3 and the terminal Tm4.

The bidirectional DC-DC converter 3b forms an H-bridge circuit, by which it is possible to control the link voltage Vlink to any voltage value regardless of the magnitude relationship between the link voltage Vlink and the voltage of the main battery 5. As a matter of course, by fixing the switching element Q5 and the switching element Q7 to the ON state and the switching element Q6 and the switching element Q8 to the OFF state, a through operation can be performed in a similar manner as to the bidirectional DC-DC converter 3a in the second embodiment. Diodes D1 to D4 are connected in anti-parallel to the switching elements Q5 to Q8, respectively.

Figure 8:
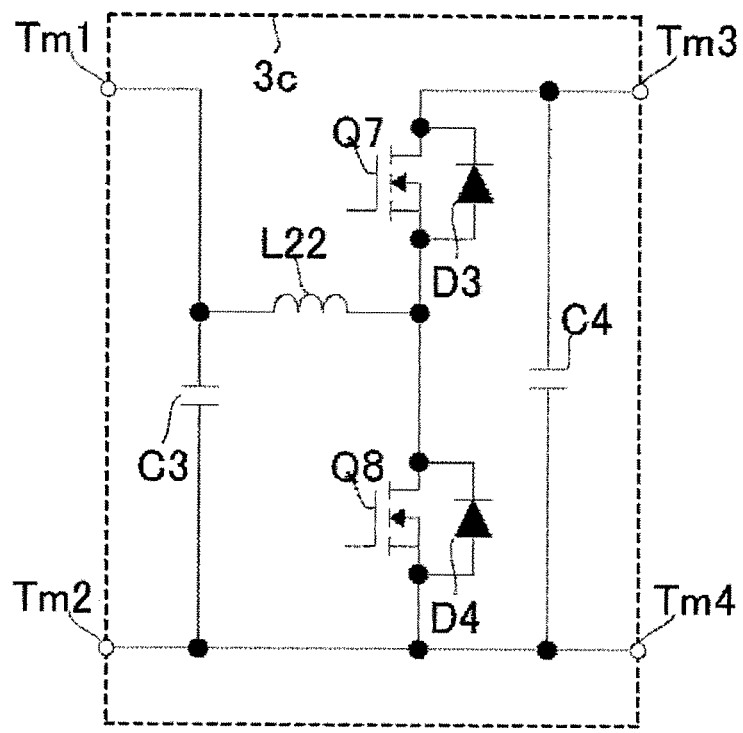
FIG. 8 is a circuit configuration diagram of a bidirectional DC-DC converter 3*c* according to the third embodiment.

It is to be noted that when the voltage of the main battery 5 is always higher than the link voltage Vlink, the bidirectional DC-DC converter 3b can be replaced with a bidirectional DC-DC converter 3c illustrated in FIG. 8. The bidirectional DC-DC converter 3c includes a smoothing capacitor C3, a smoothing inductor L22, a switching element Q8, a switching element Q7, and a smoothing capacitor C4. The smoothing capacitor C3 is connected between a terminal Tm1 and a terminal Tm2. The smoothing inductor L22 and the switching element Q8 are connected in series between the terminal Tm1 and the terminal Tm2. The switching element Q7 and the smoothing capacitor C4 are connected in series between both ends of the switching element Q8. Between both ends of the smoothing capacitor C4 are connected to between the terminals Tm3 and Tm4.

The bidirectional DC-DC converter 3c can cope with high voltage of the main battery 5 while having a more simplified configuration than the bidirectional DC-DC converter 3b. As a matter of course, a through operation can be performed by fixing the switching element Q7 to the ON state and the switching element Q8 to the OFF state.

In either case using the bidirectional DC-DC converter 3b or the bidirectional DC-DC converter 3c, it is possible to reduce the loss of each converter and improve the overall efficiency through a control with the link voltage Vlink that optimally reflects the output voltage Vout of the insulated DC-DC converter 4a.

As described in the first to third embodiments, the power supply device according to each of the embodiments includes the bidirectional DC-DC converter between a direct-current link voltage, which is controlled in accordance with the output voltage, and the main battery. When power is supplied from the main battery to the load, a link voltage having a voltage range narrower than that of the main battery is generated and supplied to the insulated DC-DC converter. At this time, the power supply device according to the present embodiment may not necessarily include a charging function with the insulated AC-DC converter. For example, the bidirectional DC-DC converter in the power supply device according to the present embodiment may be a unidirectional DC-DC converter supporting only a discharge from the main battery.

In addition, the circuit presented as the insulated DC-DC converter 4a in FIG. 4 is just for describing the basic operation, and is not limited thereto. It goes without saying that for example, even if a circuit in which a clamp circuit is added to the secondary side or another circuit system is applied for loss reduction, the example of obtaining the effect by applying the control of the present invention is included.

REFERENCE SIGNS LIST 1 power supply device
1a power supply device
2 insulated AC-DC converter
2a insulated AC-DC converter
3 bidirectional DC-DC converter
3a bidirectional DC-DC converter
3b bidirectional DC-DC converter
3c bidirectional DC-DC converter
4 insulated DC-DC converter
4a insulated DC-DC converter
5 main battery
6 low voltage battery
7 load
10 alternating-current power supply
11 control means
12 converter control block
13 control block
14 target voltage setting block
23 voltage sensor
24 voltage sensor
25 voltage sensor
31 current sensor
32 current sensor
33 current sensor
34 current sensor
100 electric vehicle
101 charging connector
102 converter
103 inverter
104 power motor
Q1 to Q8 switching element
H1 to H4 switching element
S1 switching element
S2 switching element
D1 to D4 diode
DH1 to DH4 diode
DS1 diode
DS2 diode C1 to C6 smoothing capacitor
L1 to L3 smoothing inductor
L21 smoothing inductor
L22 smoothing inductor
Lr10 resonant inductor
T10 transformer
N10 to N13 winding
Tm1 to Tm4 terminal
Nd1 node
Nd2 node
Vb1 battery voltage
Vlink link voltage
VlinkL lower limit link voltage
Vout output voltage
Vref1 target output voltage
Vref1' input voltage

The invention claimed is:

1. A power supply device comprising:
a direct current to direct current (DC-DC) converter configured to supply power to a low voltage line; and
a chopper configured to receive a voltage of a high voltage battery and output a link voltage to be input to the DC-DC converter,
wherein the link voltage is changed according to a voltage of the low voltage line, and
wherein a control response speed of the link voltage with respect to a voltage fluctuation of the low voltage line is slower than a fluctuation of the high voltage battery.

2. The power supply device according to claim 1, wherein the DC-DC converter is of an insulation type.

3. The power supply device according to claim 1, wherein the chopper is able to convert power bidirectionally.

4. The power supply device according to claim 1, wherein while the chopper performs a step-up operation, the link voltage is changed according to the voltage of the low voltage line.

5. The power supply device according to claim 4, wherein when a target value of the link voltage is lower than the voltage of the high voltage battery, the chopper fixes a switching state and performs a through operation that brings the link voltage close to the voltage of the high voltage battery.

\* \* \* \* \*